United States Patent [19]

Day

[11] Patent Number: 5,288,447
[45] Date of Patent: Feb. 22, 1994

[54] METHOD OF MAKING PERMANENT MAGNET ROTORS

[75] Inventor: James Day, Scotia, N.Y.

[73] Assignee: General Electric Company, Schenectady, N.Y.

[21] Appl. No.: 20,968

[22] Filed: Feb. 22, 1993

[51] Int. Cl.⁵ ............................................. B29C 43/18
[52] U.S. Cl. .................................. 264/112; 264/115; 264/122; 264/DIG. 58
[58] Field of Search ........ 264/112, 115, 122, DIG. 58

[56] References Cited

U.S. PATENT DOCUMENTS

| | | | |
|---|---|---|---|
| 4,558,077 | 12/1985 | Gray | 523/458 |
| 4,832,891 | 5/1989 | Kass | 264/101 |
| 4,981,635 | 1/1991 | Yamashita et al. | 264/112 |
| 5,004,577 | 4/1991 | Ward | 264/112 |
| 5,100,604 | 3/1992 | Yamashita et al. | 264/115 |

*Primary Examiner*—Mary Lynn Theisen
*Attorney, Agent, or Firm*—Jill M. Breedlove; Marvin Snyder

[57] ABSTRACT

A plastic binder is milled to a powder, preferably having a particle size equal to the mean size of flakes of permanent magnet material, and dry mixed with the magnetic flakes. A molding fixture is heated to a temperature higher than that of the melting point of the plastic binder. A rotor core, having a rounded upper edge for molding a thin cylindrical magnet thereon, of solid or laminated soft magnetic material is prepared and placed in the molding fixture and brought up to the molding temperature. The mixture is poured in measured amounts into the upper chamber of the hot molding fixture and then compressed and melted. The fluid mixture is transferred into a molding cavity surrounding the rotor core in the lower chamber and cooled. After cooling, the finished permanent magnet rotor is ejected. Advantageously, by this method, the proportion of magnetic material to plastic may be increased to approximately 80%/20% magnetic material to plastic by volume, and the magnets may be made thinner.

14 Claims, 1 Drawing Sheet

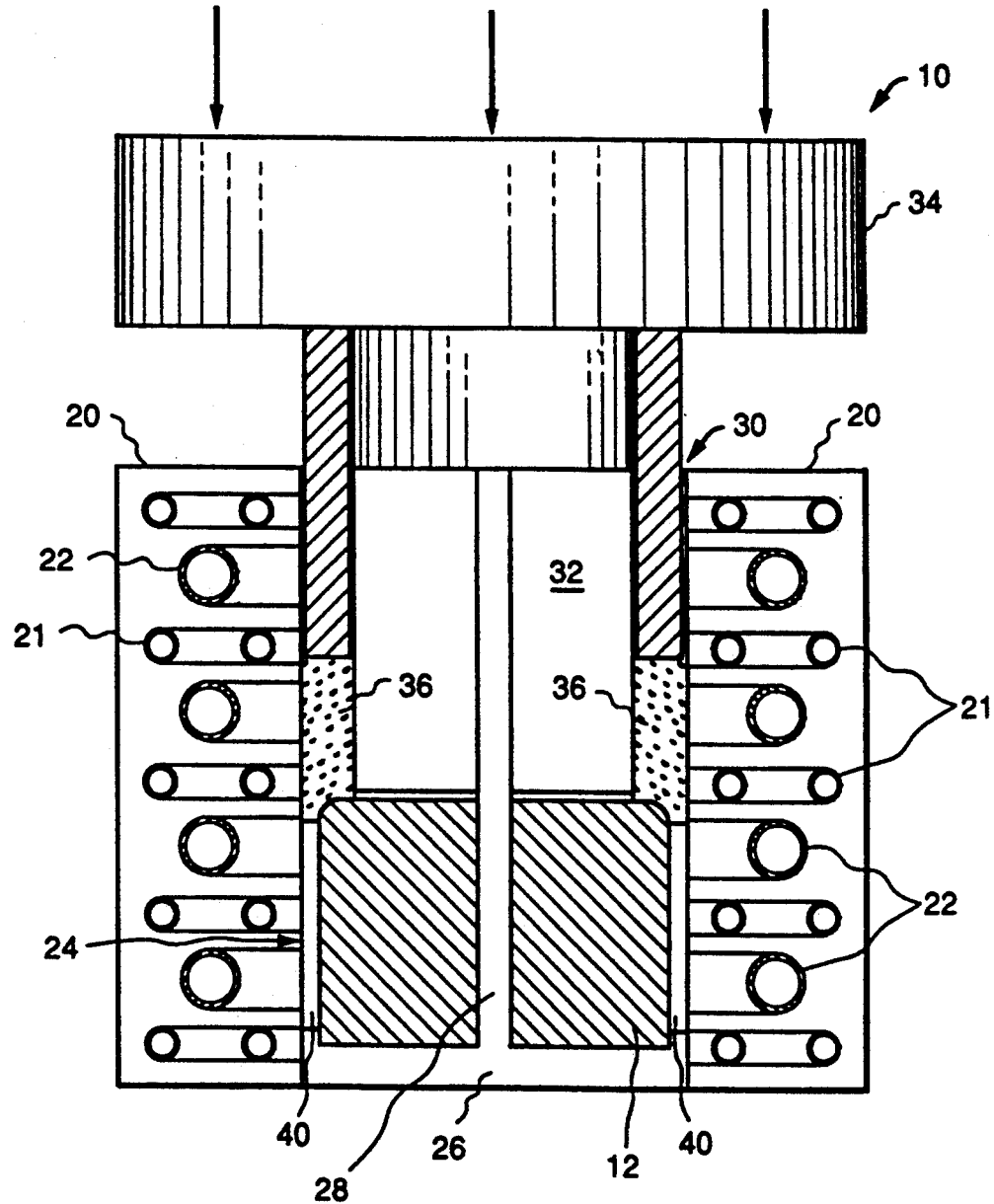

METHOD OF MAKING PERMANENT MAGNET ROTORS

FIELD OF THE INVENTION

The present invention relates generally to methods for making permanent magnet rotors and, more particularly, to a method for making small permanent magnet rotors with thin molded magnets.

BACKGROUND OF THE INVENTION

Molding magnets instead of forming, machining and assembling them is cost effective. Molded magnets are made of a mixture of magnetizable powder and a binder, typically nylon or other thermoplastic. The magnetic powder and binder are usually compounded in an extruder; then, pellets of the mixture are used to injection mold parts. The higher the magnetic material loading, the more effective the magnet; therefore, thinner magnets with less magnetic material are required. The standard method of compounding and injection molding has an upper limit (by volume) of about 60%/40% of magnetic material to plastic, above which adding more magnetic material results in impractical flowability and workability in the injection molder.

SUMMARY OF THE INVENTION

A plastic binder is milled to a powder and dry mixed with the magnetic flakes. Preferably, the plastic powder has a particle size equal to the mean size of flakes of permanent magnet material. A molding fixture, having upper and lower chambers, is heated to a temperature preferably higher (e.g., approximately 10°-15° C. higher) than that of the melting point of the plastic binder. A rotor core with a given geometry of solid or laminated soft magnetic material is prepared and placed in the molding fixture and brought up to the molding temperature. The mixture is poured in measured amounts into the upper chamber of the hot molding fixture wherein the plastic component is allowed to melt, increasing the mixture's flowability and lubricity, and then compressed. The fluid mixture is transferred into a molding cavity in the lower chamber surrounding the rotor core and cooled. After cooling, the finished permanent magnet rotor is ejected.

Advantageously, by this method, the proportion of magnetic material to plastic may be increased to approximately 80%/20% or more by volume. Furthermore, this method does not involve an extruder compounding step, which would otherwise tend to degrade both the binder and the magnetic material, while adding to cost. As another advantage, the result is a more uniform product without voids or shrinkage. Still further, thinner layers may be formed reliably.

BRIEF DESCRIPTION OF THE DRAWINGS

The features and advantages of the present invention will become apparent from the following detailed description of the invention when read with the accompanying drawing in which:

FIG. 1 illustrates a cross sectional view of a molding fixture containing a rotor core onto which thin permanent magnets are to be molded in accordance with the present invention.

DETAILED DESCRIPTION OF THE INVENTION

FIG. 1 illustrates a molding fixture 10 containing a rotor core 12 for molding permanent magnets thereon in accordance with the present invention. Molding fixture 10 includes: a body 20 fitted with heating channels 21 and cooling channels 22; a lower chamber 24 for containing the rotor core, the lower chamber including a base 26 with a centering pin 28; an annular upper chamber 30 for receiving a prepared dry mixture of binder and permanent magnet material, the upper chamber including an insert 32 to guide and retain the mixture therein; a compression ring 34 for compressing and moving the mixture in a molten state to lower chamber 24 wherein it is densified and adhered to the outer diameter of the rotor core.

The method of making a permanent magnet rotor core according to the present invention includes the following steps. A binder material is milled, to a powder, preferably having a particle size approximately equal to the mean size of flakes of permanent magnet material. A suitable binder material comprises a plastic, such as, for example: nylon; a crystalline polymer, such as a General Electric Company; or a suitable epoxy, such as polybutyleneteraphthalate (PBT), e.g., VALOX TM PBT sold by that described in U.S. Pat. No. 4,558,077, issued Dec. 10, 1985 to General Motors Corporation, and incorporated by reference herein. If desired, the plastic and the magnetic flakes may be remilled to an even smaller size in order to achieve even better edge definition. The plastic powder is dry mixed with the magnetic material in a proportion up to approximately 80%/20% of magnetic material to plastic by volume. To enhance and lubricate the molding process, zinc stearate may be added to the mixture, for example in an amount equal to approximately 0.2% by weight of the plastic component of the mixture. Static cling and interlocking between the magnetic material and the plastic provide for a stable mixture. The mixture, represented by the numeral 36, is then poured in measured amounts into the upper chamber of the molding fixture which has been heated to a temperature higher than that of the melting point of the plastic, e.g., about 10°-15° C. higher.

Rotor core 12, prepared of solid or laminated soft magnetic material according to a well-known method, is situated in lower chamber 24 of molding fixture 10. A soft magnetic material is briefly defined as having a high permeability and a low remanance, exemplary soft magnetic materials being carbon or silicon steel. Core 12 has a rounded upper edge, as shown. Hence, with the core in place, the assembly provides a nozzle-shaped gap that facilitates the transition of the very abrasive mixture of low flowability from the upper to the lower chamber. A gap 40 between the outer diameter of the core and the inner diameter of the molding fixture represents the volume of the molded magnet to exist on the finished permanent magnet rotor. An exemplary range of thicknesses of the finished permanent magnet is on the order of approximately ten mils to one quarter of an inch or more.

With the rotor core at the molding temperature, uniform pressure on compression ring 34 serves to feed the now molten mixture of plastic and magnetic material into gap 40. For example, pressure may be exerted on the order of approximately 15,000 to 25,000 psi. The pressure is maintained while the molding fixture cools to well below the molding temperature (e.g., approximately 50° C. below), at which time the finished permanent magnet rotor core is ejected. In alternative embodiments, molding fixture 10 has multiple molding chambers 24 such that several rotors can be made during each manufacturing cycle.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for making a permanent magnet rotor, comprising the steps of:
    preparing a rotor core of solid or laminated soft magnetic material;
    milling a binder material to a powder of particles of predetermined size;
    dry mixing the powder with magnetic particles;
    placing the rotor core in a lower chamber of a molding fixture, said molding fixture having an upper chamber for receiving the mixture of said powder and magnetic particles;
    putting the mixture into said supper chamber;
    heating the molding fixture and rotor core to a temperature above that of the melting point of the binder material;
    melting the binder material and compressing the mixture;
    transferring the mixture of the lower chamber and compressing the mixture in the lower chamber about the rotor core; and
    cooling the mixture to form a permanent magnet of predetermined thickness about the rotor core.

2. The method of claim 1 wherein said rotor core has a rounded upper edge.

3. The method of claim 1 wherein the particles of binder material have a particle size approximately equal to the mean size of the magnetic particles.

4. The method of claim 1 wherein the mixture comprises a volume ratio of magnetic material to binder material in the range from approximately 60%/40% to approximately 80%/20%.

5. The method of claim 1 wherein said binder comprises a plastic.

6. The method of claim 1 wherein said permanent magnet has a thickness in the range from approximately ten mils to approximately one quarter of an inch.

7. The method of claim 1, further comprising the step of adding zinc stearate to the mixture for lubricating the molding fixture.

8. A method for molding thin permanent magnetic material to a rotor core, comprising the steps of:
    milling a binder material to a powder of particles of predetermined size;
    dry mixing the powder with magnetic particles;
    placing the rotor core in a lower chamber of a molding fixture, said molding fixture having an upper chamber for receiving the mixture of said powder and magnetic particles, said lower chamber providing a thin gap about said rotor core;
    putting the mixture into said upper chamber;
    heating the/molding fixture and rotor core to a temperature above that of the melting point of the binder material;
    melting, the binder material and compressing the mixture;
    transferring the mixture to the lower chamber compressing the mixture in the gap in the lower chamber about the rotor core; and
    cooling the mixture to form a permanent magnet of predetermined thickness about the rotor core.

9. The method of claim 8 wherein said rotor core has a rounded upper edge.

10. The method of claim 8 wherein the particles of binder material have a particle size approximately equal to the mean size of the magnetic particles.

11. The method of claim 8 wherein the mixture comprises a volume ratio of magnetic material to binder material in the range from approximately 60%/40% to approximately 80%/20%.

12. The method of claim 8 wherein said binder comprises a plastic.

13. The method of claim 8 wherein said permanent magnet has a thickness in the range from approximately ten mils to approximately one quarter of an inch.

14. The method of claim 8, further comprising the step of adding zinc stearate to the mixture for lubricating the molding fixture.

* * * * *

UNITED STATES PATENT AND TRADEMARK OFFICE
CERTIFICATE OF CORRECTION

PATENT NO. : 5,288,447
DATED : February 22, 1994
INVENTOR(S) : James Day

It is certified that error appears in the above-indentified patent and that said Letters Patent is hereby corrected as shown below:

Column 2, line 25, after a, delete "General Electric Company; or a suitable epoxy, such as polybutyleneteraphthalate (PBT), e.g., VALOX$^{TM}$ PBT sold by that described in U.S. Pat. No. 4,558,077, issued Dec. 10, 1985 to General Motors Corporation, and incorporated by reference herein." and insert --polybutyleneteraphthalate (PBT), e.g., VALOX$^{TM}$ sold by General Electric Company; or a suitable epoxy, such as that described in U.S. Pat. No. 4,558,077, issued Dec. 10, 1985 to General Motors Corporation, and incorporated by reference herein.--

Signed and Sealed this

Eleventh Day of October, 1994

*Attest:*

BRUCE LEHMAN

*Attesting Officer*   *Commissioner of Patents and Trademarks*